Sept. 8, 1970   R. E. BOLZ   3,526,967
PELT DRYING SYSTEM
Filed Jan. 21, 1969   2 Sheets-Sheet 1
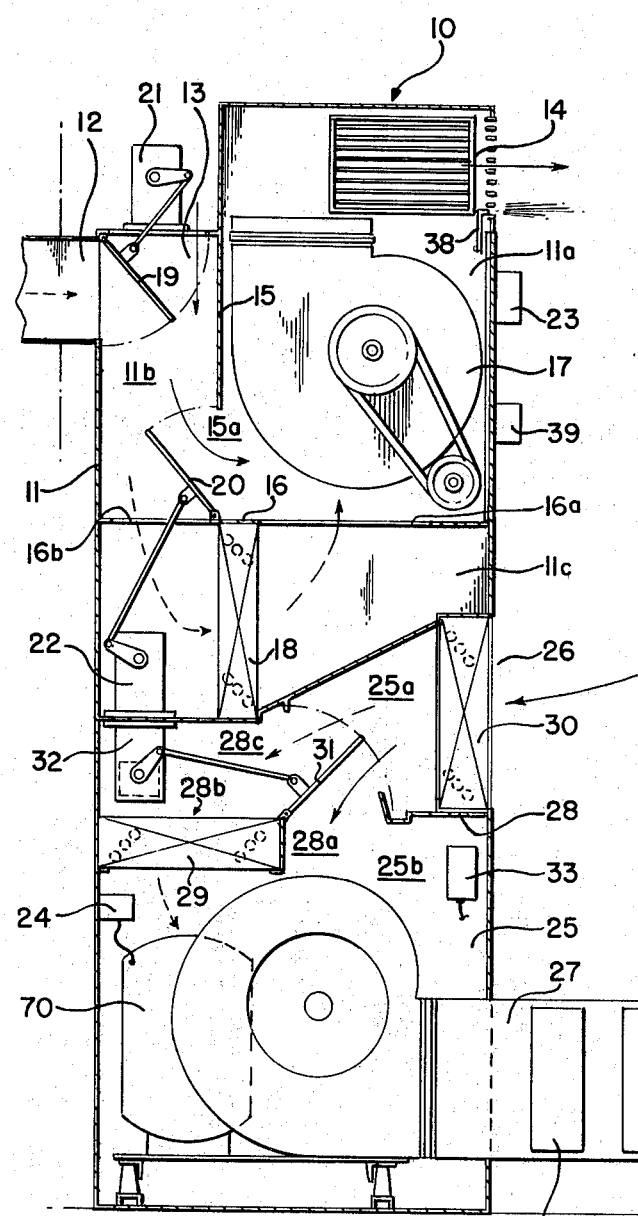
ROBERT E. BOLZ
INVENTOR.
BY *Seed, Berry- Dowrey*
ATTORNEYS

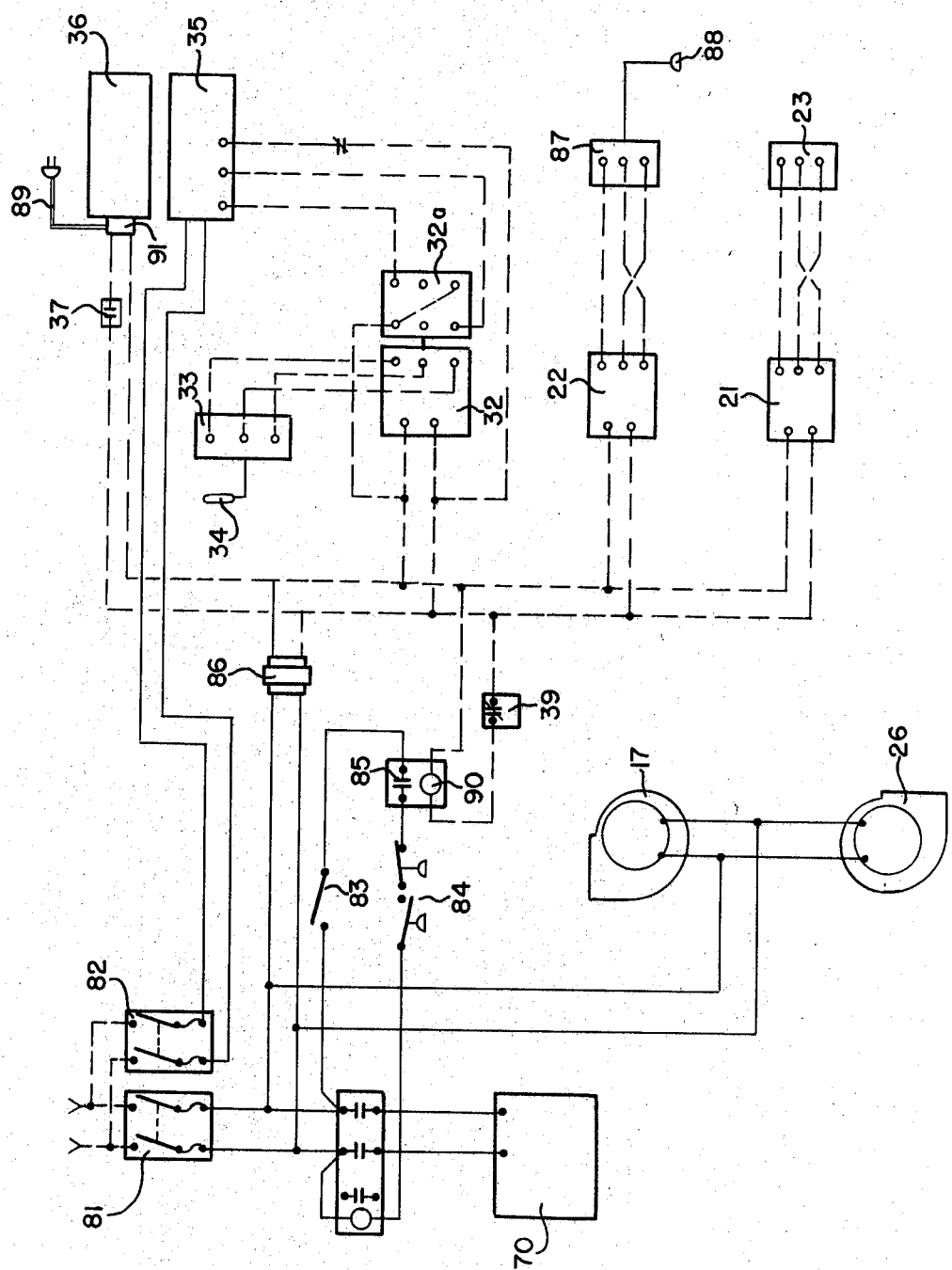

ably upon the position of the damper. Modulating damper 20 is located between compartment 11b and compartment 11c containing heating coils 18. The air flow from compartment 11b to compartment 11c can be varied depending upon the position of damper 20.

3,526,967

PELT DRYING SYSTEM
Robert E. Bolz, 1270 Highway 99,
Edmonds, Wash. 98020
Filed Jan. 21, 1969, Ser. No. 792,404
Int. Cl. F26b 21/06
U.S. Cl. 34—46                                    11 Claims

ABSTRACT OF THE DISCLOSURE

A pelt drying system for drying pelts fur side out is disclosed which comprises a manifold or series of manifolds having structurally improved air discharge nozzles therein for supplying temperature and humidity controlled air to drying frames through a common trunk line connected to an air conditioning unit. The air conditioning unit controls not only the temperature and humidity of air entering the manifold to dry the pelts but also the temperature and humidity of the air surrounding the pelts and the manifold. The air conditioning unit comprises a first means for supplying temperature and humidity controlled air to the interior of the manifold or manifolds and thence to the pelts, the air supply for the second means being air supplied to the enclosed drying zone by the first means. Heating and cooling control means are provided for automatically controlling the temperature and humidity of the air.

BACKGROUND OF THE INVENTION

Field of the invention

This invention relates to an apparatus for drying pelts fur side out and to an air conditioning unit for delivering temperature and humidity controlled air to an enclosed drying zone.

PRIOR ART RELATING TO THE INVENTION

An improved method and drying frame for drying pelts, particularly pelts of mink and other similar fur bearing animals, is disclosed in U.S. Pat. No. 3,313,038. As disclosed therein, fresh pelts are stretched over non-absorbent racks or holding frames and the frames connected by tubular members to air discharge nozzzles of a manifold supplying drying air to the discharge nozzles. The process of fur out pelting as disclosed therein has been highly successful. To achieve maximum results using the drying frames disclosed in the above mentioned patent closely controlled temperature and humidity drying air must be supplied to the manifold to which the pelt drying frames are attached. In addition, the temperature and humidity of the air surrounding the drying frames must be controlled.

A problem encountered in the use of a manifold having air discharge nozzles of the type described in U.S. Pat. No. 3,313,038 was in breakage of the air discharge nozzles at their point of attachment to the manifold or manifolds.

SUMMARY OF THE INVENTION

This invention has as its main object an air conditioning unit for supplying temperature and humidity controlled air to a manifold or series of manifolds having a series of air discharge nozzles to which pelt drying frames are attached, and for supplying temperature and humidity controlled air to an enclosed drying zone surrounding the drying frames and/or manifolds.

The air conditioning unit comprises two enclosed chambers in which blowers are mounted. One chamber supplies temperature and humidity controlled air to the drying zone surrounding the pelt drying frames and manifold or manifolds and the second chamber supplies temperature and humidity controlled air to the interior of the manifold or manifolds and pelt drying frames using the drying zone air as its intake air supply. Control devices, i.e. modulating dampers connected to controllers responsive to the temperature and humidity of the air, vary the input of air over heating and cooling coils in the enclosed chambers.

The air discharge nozzles connected to the manifold or manifolds are structurally improved to resist breakage. Each of the tubular air discharge nozzles extends through the wall of the manifold. Flanges in contact with the inside and outside walls of the manifold extend outwardly from the circumference of the discharge nozzles.

BRIEF DESCRIPTION OF THE DRAWINGS

FIG. 1 is an isometric view showing an airconditioning unit, a manifold to which a pelt drying frame is attached, and a trunk line interconnecting the air conditioning unit and manifold;

FIG. 2 is a sectional side elevational view of the air conditioning unit, a partial sectional view of the trunk line, and a partial sectional view of the manifold of FIG. 1;

FIG. 3 is an expanded sectional view along lines 3—3 of FIG. 2 illustrating the improved manner in which the air discharge nozzles are attached to the manifold; and FIG. 4 is a wiring diagram of the air conditioning unit.

DETAILED DESCRIPTION OF THE INVENTION

Drying pelts, such as mink pelts, by the fur out method using drying frames such as described in U.S. Pat. 3,313,038 is preferably carried out under closely controlled temperature and humidity conditions. Pelts of mink can be dried at temperatures ranging from 50 to 75° F. at humidities ranging from about 50 to 80% respectively. Preferably, however, pelts are dried at about 60° F. and 55 to 65% humidity. These temperatures and humidity conditions should be maintained not only in the drying air passing through the drying frames attached to the manifold but also in the air surrounding the drying frames. The air conditioning unit of this invention is capable of maintaining close control of air supplied to the drying frames and air supplied to the surrounding drying zone. As used herein, the term "drying zone" means the enclosed area surrounding the pelt drying frames on which the pelts are mounted for drying.

Referring to FIG. 1 an air conditioning unit 10 is shown connected to a manifold 50 by means of a trunk line 40. Although only one manifold is shown attached to the air conditioning unit a series of manifolds having a common trunk line can be atached to one air conditioning unit.

The air conditioning unit 10 is shown in more detail in FIG. 2. The unit comprises an upper chamber 11 having an outside air inlet 12, a return air inlet 13 and a discharge air outlet 14. Upper chamber 11 is sectioned into three compartments 11a, 11b and 11c by separator plates 15 and 16 which have openings 15a, 16a and 16b therein respectively. A motor driven blower 17 is mounted in compartment 11a of upper chamber 11 and is adapted to pull air in from the outlet and return air ducts and discharge it through air outlet 14. Heating coils 18 are mounted in compartment 11c of the upper chamber 11. Two modulating dampers 19 and 20 are positioned as shown in FIG. 2. The dampers are linked to controllers 21 and 22 respectively through suitable linkages not shown. Modulating damper 19 is located adjacent outside air inlet 12 and return air inlet 13 and is positioned such that air entering through either of the inlets can be completely closed off or the volume of air coming into compartment 11b from each of the inlets varied depending on the temperature and humidity requirements of the drying zone. Modulating damper 20 is attached adjacent opening 15a and opening 16b. When modulating damper 20 is in the vertical position, thereby closing opening 15a, air entering through outside air inlet 12 and return air inlet 13 is forced to flow over heating coils 18 and thence to blower 17. When damper 20 is in the horizontal position, thereby closing opening 16b, air entering inlets 12 and 13 bypasses heating coils 18 and flows directly to blower 17 and out through discharge outlet 14 into the drying zone. At any position between the horizontal and vertical positions just described varying volumes of air flow through the heating coils 18 and directly to blower 17.

Air entering through outside air inlet 12 is suitable at a temperature below about 60° F. In most climates where mink are raised outside air can normally be used. If the outside air temperature is much above 60° F., some cooling is required.

Controller 21, linked to modulating damper 18, is connected to thermostat 23 which continuously senses the temperature in the drying zone. If the temperature is above the set temperature of the thermostat damper 19 opens to allow more outside air to flow through air inlet 12. If the temperature is below the set temperature damper 19 closes air inlet 12 and allows more air to recirculate through return air inlet 13. Controller 22, linked to modulating damper 20 is connected to a pressure controller 24 of hermetic compressor 70. Heating coils 18 constitute one of the heat dissipating coils of compressor 70. As the pressure rises in compressor 70 the head pressure control opens damper 20 to the vertical position thereby forcing the incoming air to pass through heating coils 18.

The lower chamber 25 of the air conditioning unit 10 is divided into compartments 25a and 25b and has an air inlet 26 and a discharge outlet 27. A blower, similar to the blower in upper chamber 11, is positioned in compartment 25b of lower chamber 25 for pulling air in through air inlet 26 and discharging it through discharge outlet 27 into trunk line 40. Compartments 25a and 25b are separated by a divider plate 28 having openings 28a and 28b. Disposed transversely across opening 28b are heating coils 29. Cooling coils 30 are placed across air inlet 26. Opening and closing of openings 28a between compartment 25a and compartment 25b is controlled by modulating damper 31 linked to controller 32 through a suitable linkage. As shown in FIG. 2 when modulating damper 31 is in a horizontal position opening 28a is closed. Air entering through air inlet 26 and cooling coils 30 is thus forced to pass through openings 28b and 28c and heating coils 29 before entering compartment 25b. When modulating damper 31 is in the vertical position opening 28c is closed. Air entering through opening 26 and cooling coils 30 then bypasses heating coils 29 and flows directly to compartment 25b. Controller 32 is operatively connected to controller 33 which, in turn, is operatively connected to temperature bulb 34 located in the air path through the trunk line 40. Bulb 34 continuously senses the temperature of the air passing through trunk line 40 and, depending on the predetermined set limits of thermostat, opens and closes modulating damper 31 to vary the volume of air flowing over the heating coils 29 and directly to the blower.

An auxiliary duct heater 35 controlled by the same thermostat 34, and a humidifier 36 responsive to humidistat 37 are located in trunk line 40. If the air temperature cannot be maintained by heating coils 29 and 18 auxiliary heater 35 automatically cuts in to supply more heat. Also, if the humidity of the air entering the trunk line is too low humidifier 36 automatically cuts in to add more moisture to the air. Heating coils 29 and cooling coils 30 are a part of compressor 70.

The air conditioning unit described is capable of maintaining the air in the drying zone surrounding the manifold and pelt drying frames and the air delivered to the interior of the manifold within about a 6° F. and 6 to 8% humidity spread. It should be noted that the air supply for the interior of the manifold and drying frames is taken from air in the enclosed drying zone and not from outside air. By so doing there is no danger in accepting outside air at a temperature and humidity not correctible by the unit located in lower compartment 25 of air conditioning unit 10.

Considering operation of the unit, air in the enclosed drying zone passes over cooling coils 30 which (1) cool the air, and (2) remove excess moisture. The air then passes over the heating coils 29 which warm the air to a predetermined temperature, usually 60° F. If the temperature of the air flowing through trunk line 40 is close to the predetermined temperature, modulating damper 31 closes opening 28c partially or totally, depending on the temperature requirement, thereby forcing the air to bypass heating coils 29 and go directly to trunk line 40 through opening 28a. If the temperature, on the other hand, is low, modulating damper 31 closes opening 28a, either partially or totally, forcing the incoming air to pass over heating coils 29. If the air does not pick up sufficient heat on flowing through heating coils 29 auxiliary heater 35 in trunk line 40 cuts in to add additional heat to the air flowing into the manifold. Also if too much moisture has been removed from the incoming air by cooling coils 30, humidistat 37 in trunk line 40 senses the deficiency and tells humidifier 36 to add additional moisture to the incoming air.

Air entering the drying zone surrounding the manifolds and pelt drying frames through air outlet 14 enters through outside air inlet 12 and return air inlet 13. If thermostat 23 senses the need for additional heat modulating damper closes outside air inlet 12, either partially or totally, depending on the requirements, thereby recirculating the air in the drying zone over heating coils 18. Opening and closing of modulating damper 29 is dictated by the heat dissipating need of compressor 70. In areas where the outside air is very cold and the humidity is low it may be necessary to add additional moisture to the air entering the drying zone. This is accomplished by a spray unit 38 (the spray nozzle only is shown in FIG. 2) positioned adjacent the discharge outlet 14 of compartment 11a. Humidistat 39, located on the front of the unit, continuously senses the relative humidity of the air in the drying zone. It is operatively connected to a unit (not shown) which controls spray unit 38. The water spray unit 38 can add as much as three gallons per hour of water to the incoming air if necessary.

The thermostats and humidistats can be set to operate between predetermined temperature and relative humidity limits. Normally the humidistats are set to operate at a plus or minus 2% spread and the thermostats a plus or minus 1½° F. At these preset conditions the air in the drying zone and that delivered to the manifold and thence to the drying frames varies only a small amount.

Referring now to FIG. 3, each of the air discharge nozzles 60 comprises a tubular nozzle 61 which extends through the wall of manifold 50. The nozzle 61 has flanges 62 and 63 which extend circumferentially outwardly and are in contact with the inside and outside walls of manifold 50. The tubular nozzles 64 of the drying frames described in U.S. Pat. 3,313,038 slide over each of the tubular discharge nozzles 61. The improved method of attachment of air discharge nozzles 60 to manifold 50 prevents breakage of the nozzles at the point of attachment.

Referring briefly to the wiring diagram of FIG. 4, incoming power to the control system, blowers, and compressor is controlled by fused switch 81. Fused switch 82 is connected to duct auxiliary heater 35 directly. Power flowing through switch 81 is also connected to on-off switch 83, high-low pressure switch 84 and contacts 85. Power flowing to step-down transformer 86 is reduced in voltage to about 24 volts to power the control system for the modulating dampers and their controllers. As shown controller 21, linked to modulating damper 19, is directly connected to thermostat 23 located on the front of air conditioning unit 10 as shown in FIGS. 1 and 2. Controller 22, linked to modulating damper 20, is directly attached to pressure controller 87 having a sensor 88. Controller 32, linked to modulating damper 31, is connected to unit 33 and sensor 34. The auxiliary duct heater 35, powered directly from the power source, is also connected to and controlled by sensor 34. Humidistat 39 is interconnected to relay 90. When the humidity in the drying zone falls below a pre-set limit the humidity control opens, triggering relay 90 which, in turn, triggers operation of the spray unit. Humidistat 37 is operatively connected to humidifier 36 and triggers operation of the humidifier through relay 91. The power supply for humidifier 36 is from an external source 89.

The air conditioning supply unit 10 is capable of furnishing temperature and humidity controlled air to the drying zone surrounding pelt frames on which pelts of mink or other similar fur bearing animals are mounted and for supplying air to the interior of the fur pelts to dry them fur side out. By closely controlling the temperature and humidity conditions of the air entering both these areas pelts of high quality are obtained.

The embodiments of the invention in which an exclusive property or privilege is claimed are defined as follows:

1. An apparatus for drying pelts fur side out, the apparatus and the pelts disposed in an enclosed drying zone, comprising;
    a manifold having a plurality of air discharge nozzles for supplying temperature and humidity controlled air to drying frames on which the pelts are mounted;
    first means for supplying and controlling the temperature and humidity of air to the enclosed drying zone; and
    second means for supplying and controlling the temperature and humidity of air to the interior of the manifold and thence to the pelts, the air supply for the second means being the air supplied to the enclosed drying zone by the first means.

2. The apparatus of claim 1 wherein the first means comprises
    (a) a first enclosed chamber having therein an outside air inlet, a return air inlet and a discharge air outlet,
    (b) a first power driven blower mounted therein,
    (c) proportioning means disposed adjacent the outside and return air inlets for varying the proportion of outside and return air pulled into the enclosed chamber,
    (d) first heating means disposed in the enclosed chamber for heating the air moving therethrough, and
    (e) first control means for controlling the air flow over the first heating means; and
wherein the second means comprises
    (a) a second enclosed chamber having therein an air inlet opening zone and an air discharge outlet leading to the interior of the manifold,
    (b) a second power driven means mounted therein,
    (c) cooling means disposed transversely across the air inlet,
    (d) second heating means disposed in the second closed chamber, and
    (e) control means for controlling the air flow over the second heating means.

3. The apparatus of claim 2 including a duct interconnecting the air discharge outlet of the second enclosed chamber and the interior of the manifold, the duct having a third heating means and a humidifying means disposed transversely thereacross for final adjustment of the air temperature and humidity delivered to the interior of the manifold, and sensing means for sensing the temperature and humidity of the air flowing through the duct.

4. The apparatus of claim 2 including spray means disposed adjacent the discharge air outlet of the first enclosed chamber for spraying water mist into the air, thereby increasing the humidity of the air.

5. The apparatus of claim 2 wherein the proportioning means includes a modulating damper disposed adjacent the outside and return air inlets, a controller operatively attached to the damper, and a thermostat operatively connected to the controller disposed so as to continuously sense the temperature in the enclosed drying zone.

6. The apparatus of claim 2 wherein the first and second heating means and the cooling means are the heat dissipating coils and cooling coils respectively of a compressor.

7. The apparatus of claim 2 wherein the first control means comprises a modulating damper, a controller operatively connected to the damper, and a pressure controller sensing the head pressure of the compressor.

8. The apparatus if claim 2 wherein the second control means comprises a modulating damper, a controller operatively connected to the damper, and a thermostat responsive to the temperature of the air delivered to the interior of the manifold.

9. The apparatus of claim 4 including humidity sensing means disposed in the duct and in the enclosed drying zone to sense the humidity of the enclosed drying zone and in the air delivered to the interior of the manifold, the sensing means operatively connected to the humidifying means and spray means.

10. The apparatus of claim 1 wherein the air discharge nozzles of the manifold comprise tubular nozzles extending through the wall of the manifold, each of the tubular nozzles having flanges extending outwardly from the circumference of the nozzle and in contact with the inside and outside walls of the manifold.

11. An apparatus for furnishing temperature and humidity controlled air to an enclosed drying zone and to the interior of a manifold comprising: an enclosed drying zone, a manifold having a plurality of air discharge nozzles,
    a first enclosed chamber having an outside air inlet a return air inlet and a discharge air outlet,
    a first power driven blower mounted therein,
    proportioning means disposed adjacent the outside and return air inlets for varying the proportion of outside and return air entering the enclosed chamber,
    first heating means disposed in the enclosed chamber for heating the air moving therethrough,
    first control means for controlling the air flow over the first heating means,
    a second enclosed chamber having an air inlet disposed so as to pull air from the enclosed drying zone and an air discharge outlet leading to the interior of the manifold,
    a second power driven blower mounted therein,
    cooling means disposed transversely across the air inlet of the second enclosed chamber,
    second heating means disposed in the second enclosed chamber for heating the air therein, and
    control means for controlling air flow over the second heating means.

References Cited

UNITED STATES PATENTS

| 1,408,457 | 3/1922 | Harrison | 34—46 X |
| 2,177,496 | 10/1939 | Miller | 165—16 |
| 2,338,382 | 1/1944 | Marlow | 165—16 X |

CARROLL B. DORITY, Jr., Primary Examiner

U.S. Cl. X.R.

34—48, 104; 165—16